United States Patent
Sim et al.

(10) Patent No.: US 9,743,096 B2
(45) Date of Patent: Aug. 22, 2017

(54) SCALABLE VIDEO CODING METHOD AND APPARATUS USING INTER PREDICTION MODE

(71) Applicant: INTELLECTUAL DISCOVERY CO., LTD., Seoul (KR)

(72) Inventors: Dong Gyu Sim, Seoul (KR); Jung Hak Nam, Seoul (KR); Hyun Ho Jo, Seoul (KR); Hyo Min Choi, Seoul (KR)

(73) Assignee: Intellectual Discovery Co., LTD., Seoul (KR)

( * ) Notice: Subject to any disclaimer, the term of this patent is extended or adjusted under 35 U.S.C. 154(b) by 0 days.

(21) Appl. No.: 15/066,477

(22) Filed: Mar. 10, 2016

(65) Prior Publication Data
US 2016/0191930 A1 Jun. 30, 2016

Related U.S. Application Data

(63) Continuation of application No. 13/659,006, filed on Oct. 24, 2012, now abandoned.
(Continued)

(30) Foreign Application Priority Data

Dec. 8, 2011 (KR) .................. 10-2011-0131156

(51) Int. Cl.
*H04N 7/12* (2006.01)
*H04N 19/30* (2014.01)
(Continued)

(52) U.S. Cl.
CPC ........... *H04N 19/30* (2014.11); *H04N 19/105* (2014.11); *H04N 19/159* (2014.11);
(Continued)

(58) Field of Classification Search
CPC .................................................... H04N 19/105
(Continued)

(56) References Cited

U.S. PATENT DOCUMENTS 6,741,748 B1 5/2004 Son et al.
7,742,524 B2 6/2010 Jeon et al.
(Continued)

OTHER PUBLICATIONS

Joint Scalable Video Model JSVM-3; Reichel; 2005.*
(Continued)

*Primary Examiner* — William C Vaughn, Jr.
*Assistant Examiner* — Luis Perez Fuentes
(74) *Attorney, Agent, or Firm* — NSIP Law

(57) ABSTRACT

The present invention relates to a scalable video coding method and apparatus using inter prediction mode. A decoding method includes determining motion information prediction mode on a target decoding block of an enhancement layer, predicting motion information on the target decoding block of the enhancement layer using motion information on the neighboring blocks of the enhancement layer, if the determined motion information prediction mode is a first mode, and predicting the motion information on the target decoding block of the enhancement layer using motion information on a corresponding block of a reference layer, if the determined motion information prediction mode is a second mode.

4 Claims, 10 Drawing Sheets

Related U.S. Application Data

(60) Provisional application No. 61/551,442, filed on Oct. 26, 2011.

(51) Int. Cl.
*H04N 19/105* (2014.01)
*H04N 19/159* (2014.01)
*H04N 19/176* (2014.01)
*H04N 19/52* (2014.01)
*H04N 19/53* (2014.01)

(52) U.S. Cl.
CPC .......... *H04N 19/176* (2014.11); *H04N 19/52* (2014.11); *H04N 19/53* (2014.11)

(58) Field of Classification Search
USPC .................................................. 375/240.16
See application file for complete search history.

(56) References Cited

U.S. PATENT DOCUMENTS

| | | | |
|---|---|---|---|
| 7,929,610 B2 | 4/2011 | Sun | |
| 8,050,326 B2 | 11/2011 | Yoon et al. | |
| 8,160,149 B2* | 4/2012 | Demos ................. | H04N 19/597 375/240.16 |
| 8,218,628 B2* | 7/2012 | Schwarz ............ | H04N 19/0003 375/240.08 |
| 8,315,308 B2* | 11/2012 | Bao ..................... | H04N 19/105 375/240.12 |
| 8,340,177 B2* | 12/2012 | Ji ........................... | H04N 19/63 375/240.11 |
| 8,467,459 B2* | 6/2013 | Yin ....................... | H04N 19/70 375/240.12 |
| 8,687,707 B2 | 4/2014 | Han | |
| 8,737,480 B2* | 5/2014 | Wang ............... | H04N 19/00684 375/240.12 |
| 8,761,252 B2* | 6/2014 | Park .................... | H04N 19/105 375/240.12 |
| 8,861,606 B2* | 10/2014 | Wahadaniah .......... | H04N 19/52 375/240.16 |
| 9,247,267 B2* | 1/2016 | Shimada ............. | H04N 19/543 |
| 9,521,412 B2* | 12/2016 | Onno .................. | H04N 19/105 |
| 2006/0012719 A1* | 1/2006 | Karczewicz ......... | H04N 19/187 348/699 |
| 2006/0153300 A1* | 7/2006 | Wang ..................... | H04N 19/56 375/240.16 |
| 2009/0103613 A1 | 4/2009 | Jeon et al. | |
| 2009/0168872 A1* | 7/2009 | Jeon .................... | H04N 19/176 375/240.12 |
| 2012/0263231 A1 | 10/2012 | Zhou | |
| 2013/0107962 A1* | 5/2013 | Sim ..................... | H04N 19/105 375/240.16 |
| 2014/0119441 A1 | 5/2014 | Lee et al. | |
| 2014/0198856 A1* | 7/2014 | Wu .................. | H04N 19/00684 375/240.16 |

OTHER PUBLICATIONS

Adaptive optimization filter for Inter-layer prediction in SVC; Jan. 2009.*
Joint Scalable Video Model JSVM-3; 2005.*

* cited by examiner

SCALABLE VIDEO CODING METHOD AND APPARATUS USING INTER PREDICTION MODE

This application is a Continuation of U.S. patent application Ser. No. 13/659,006 filed on Oct. 24, 2012, which claims benefit to Application No. 61/551,442 filed Oct. 26, 2011, and which claims benefit under 35 U.S.C. §119(a) of Korean Patent Application No. 10-2011-0131156 filed Dec. 8, 2011, in the Korean Intellectual Property Office, the contents of all of which are incorporated herein by reference in their entireties.

BACKGROUND OF THE INVENTION

Field of the Invention

The present invention relates to video processing technology and, more particularly, to a scalable video coding method and apparatus for coding/decoding a video.

Discussion of the Related Art

As broadcasting service having High Definition (1280× 720 or 1920×1080) is extended domestically and globally, lots of users are becoming accustomed to pictures of high resolution and high picture quality and thus lots of organizations put spurs to the development of the next-generation picture devices. Furthermore, as interest in Ultra High Definition (UHD) having resolution 4 times higher than the HDTV, together with HDTV, is increasing, moving picture standardization organizations have recognized a necessity for compression technology for a picture of higher resolution and high picture quality. Furthermore, there is a need for a new standard which can provide the same picture quality as that of the existing coding methods and also provide lots of advantages in terms of a frequency band and storage through compression efficiency higher than that of H.264/ Advanced Video Coding (AVC), that is, a moving picture compression coding standard that is now used in HDTV and mobile phones. Moving Picture Experts Group (MPEG) and Video Coding Experts Group (VCEG) jointly perform a standardization task for High Efficiency Video Coding (HEVC), that is, the next-generation video codec. An outline object of HEVC is to code a video, including a UHD image, in compression efficiency that is twice that of H.264/AVC. HEVC can provide not only HD and UHD images, but also an image of high picture quality in a frequency lower than a current frequency even in 3D broadcasting and mobile communication networks.

In HEVC, a prediction picture can be generated by performing prediction on a picture spatially or temporally, and a difference between an original picture and the predicted picture can be coded. Picture coding efficiency can be improved by this prediction coding.

SUMMARY OF THE INVENTION

An object of the present invention is to provide a scalable video coding method and apparatus which can improve coding/decoding efficiency.

In accordance with an embodiment of the present invention, a scalable video decoding method includes determining motion information prediction mode on a target decoding block of an enhancement layer; predicting motion information on the target decoding block of the enhancement layer using motion information on the neighboring blocks of the enhancement layer, if the determined motion information prediction mode is a first mode; and predicting the motion information on the target decoding block of the enhancement layer using motion information on a corresponding block of a reference layer, if the determined motion information prediction mode is a second mode.

In accordance with an embodiment of the present invention, a scalable video decoding apparatus includes a first motion prediction module configured to predict motion information on a target decoding block of an enhancement layer using motion information on neighboring blocks and a second motion prediction module configured to predict motion information on a target decoding block of the enhancement layer using motion information on a corresponding block of a reference layer, wherein any one of the first and the second motion prediction units is used to predict the motion information on the target decoding block of the enhancement layer according to motion information prediction mode signaled by a coding apparatus.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION OF THE EMBODIMENTS

Hereinafter, exemplary embodiments are described in detail with reference to the accompanying drawings. In describing the embodiments of the present invention, a detailed description of the known functions and constructions will be omitted if it is deemed to make the gist of the present invention unnecessarily vague.

When it is said that one element is "connected" or "coupled" to the other element, the one element may be directly connected or coupled to the other element, but it should be understood that a third element may exist between the two elements. Furthermore, in the present invention, the contents describing that a specific element is "included (or comprised)" does not mean that elements other than the specific element are excluded, but means that additional elements may be included in the implementation of the present invention or in the scope of technical spirit of the present invention.

Terms, such as the first and the second, may be used to describe various elements, but the elements should not be restricted by the terms. The terms are used to only distinguish one element and the other element from each other. For example, a first element may be named a second element without departing from the scope of the present invention. Likewise, a second element may also be named a first element.

Furthermore, elements described in the embodiments of the present invention are independently shown in order to indicate different and characteristic functions, and it does not mean that each of the elements consists of separate hardware or a piece of software unit. That is, the elements are arranged, for convenience of description, and at least two of the elements may be combined to form one element or one element may be divided into a plurality of elements and the plurality of elements may perform functions. An embodiment in which the elements are combined or each of the elements is divided is included in the scope of the present invention without departing from the essence of the present invention.

Furthermore, in the present invention, some elements may not be essential elements for performing essential functions, but may be optional elements for improving only performance. The present invention may be embodied using only the essential elements for implementing the essence of the present invention other than the elements used to improve only performance, and a structure including only the essential elements other than the optional elements used to improve only performance are included in the scope of the present invention.

Figure 1:
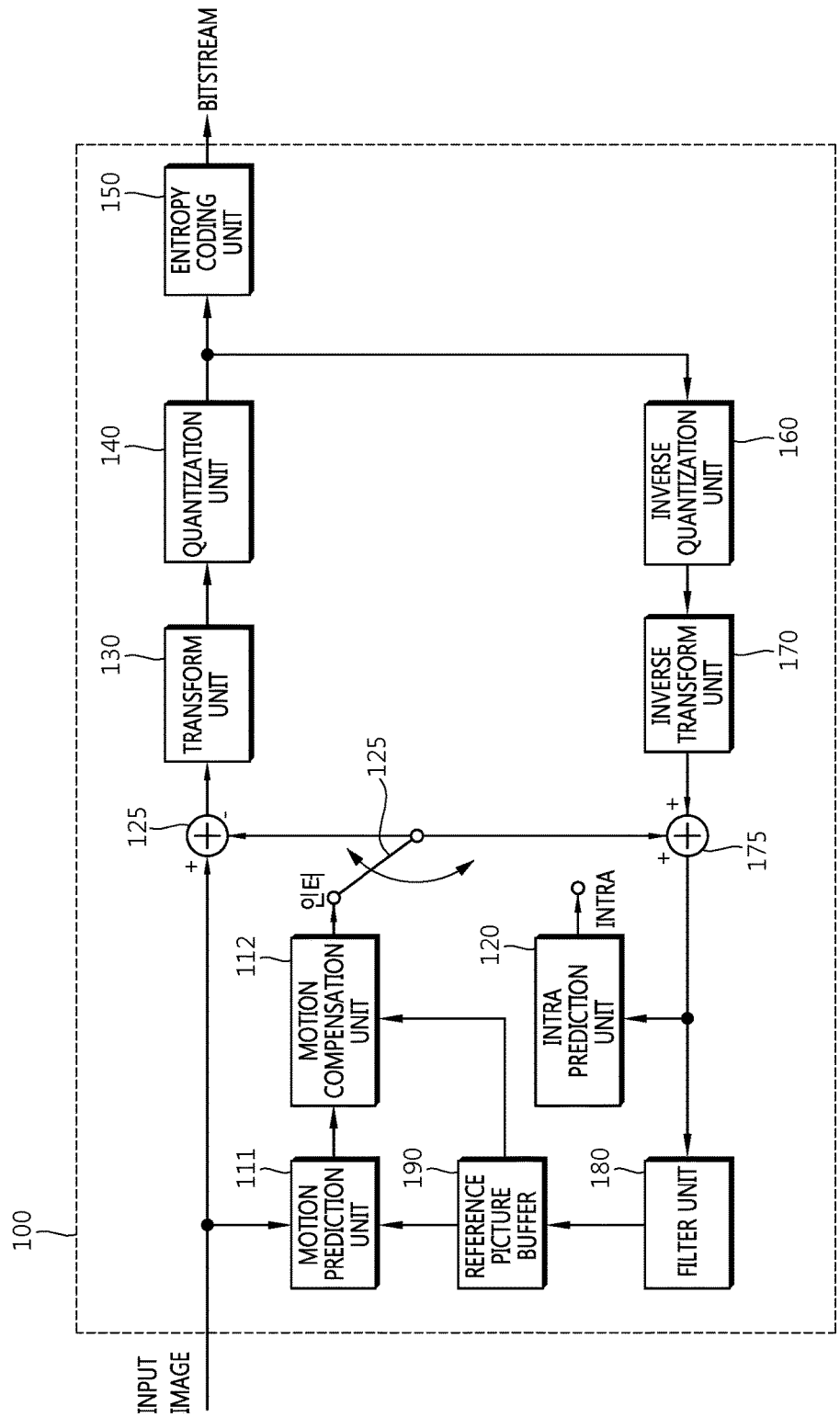
FIG. 1 is a block diagram showing a configuration according to an embodiment of a video coding apparatus to which the present invention is applied.

FIG. 1 is a block diagram showing a configuration according to an embodiment of a video coding apparatus to which the present invention is applied.

Referring to FIG. 1, the video coding apparatus 100 includes a motion prediction unit 111, a motion compensation unit 112, an intra prediction unit 120, a switch 115, a subtractor 125, a transform unit 130, a quantization unit 140, an entropy coding unit 150, an inverse quantization unit 160, an inverse transform unit 170, an adder 175, a filter unit 180, and a reference picturepicture buffer 190.

The video coding apparatus 100 performs coding on an input video in intra mode or inter mode and outputs a bitstream. Intra prediction means intra-picture prediction, and inter prediction means inter-picture prediction. In the case of the intra mode, the switch 115 is switched to the intro mode, and in the case of the inter mode, the switch 115 is switched to the inter mode. The video coding apparatus 100 generates a prediction block for the input block of the input picture and codes a difference between the input block and the prediction block.

In the case of the intra mode, the intra prediction unit 120 generates the prediction block by performing spatial prediction using the pixel values of coded neighboring blocks.

In a motion prediction process, for the case of the inter mode, the motion prediction unit 111 searches a reference picture, stored in the reference picture buffer 190, for a region that is most well matched with an input block and calculates a motion vector based on the retrieved reference picture. The motion compensation unit 112 generates a prediction block by performing motion compensation using the motion vector.

The subtractor 125 generates a residual block based on a difference between the input block and the generated prediction block. The transform unit 130 transforms the residual block and outputs transform coefficients. Furthermore, the quantization unit 140 quantizes the input transform coefficients based on quantization parameters and outputs quantized coefficients. The entropy coding unit 150 performs entropy coding on the input quantized coefficient based on a probability distribution and outputs a bitstream.

In HEVC, a current coded picture needs to be decoded and stored in order to be used as a reference picture because inter prediction coding, that is, inter-picture prediction coding, is performed. Accordingly, a quantized coefficient is dequantized by the inverse quantization (dequantization) unit 160 and inversely transformed by the inverse transform unit 170. Dequantized and inversely transformed coefficients are added to a prediction block by the adder 175, so that a reconstruction block is generated.

The reconstruction block is input to the filter unit 180. The filter unit 180 may apply at least one of a deblocking filter, a Sample Adaptive Offset (SAO), and an Adaptive Loop Filter (ALF) to a reconstruction block or a reconstructed picture. The filter unit 180 may also be called an adaptive in-loop filter. The deblocking filter can remove block distortion that occurs at the boundary between blocks. The SAO can add a proper offset value to a pixel value in order to compensate for a coding error. The ALF can perform filtering based on a value obtained by comparing a reconstructed picture with an original picture, and the filtering may be performed only when high efficiency is applied. The reconstruction block output from the filter unit 180 is stored in the reference picture buffer 190.

Figure 2:
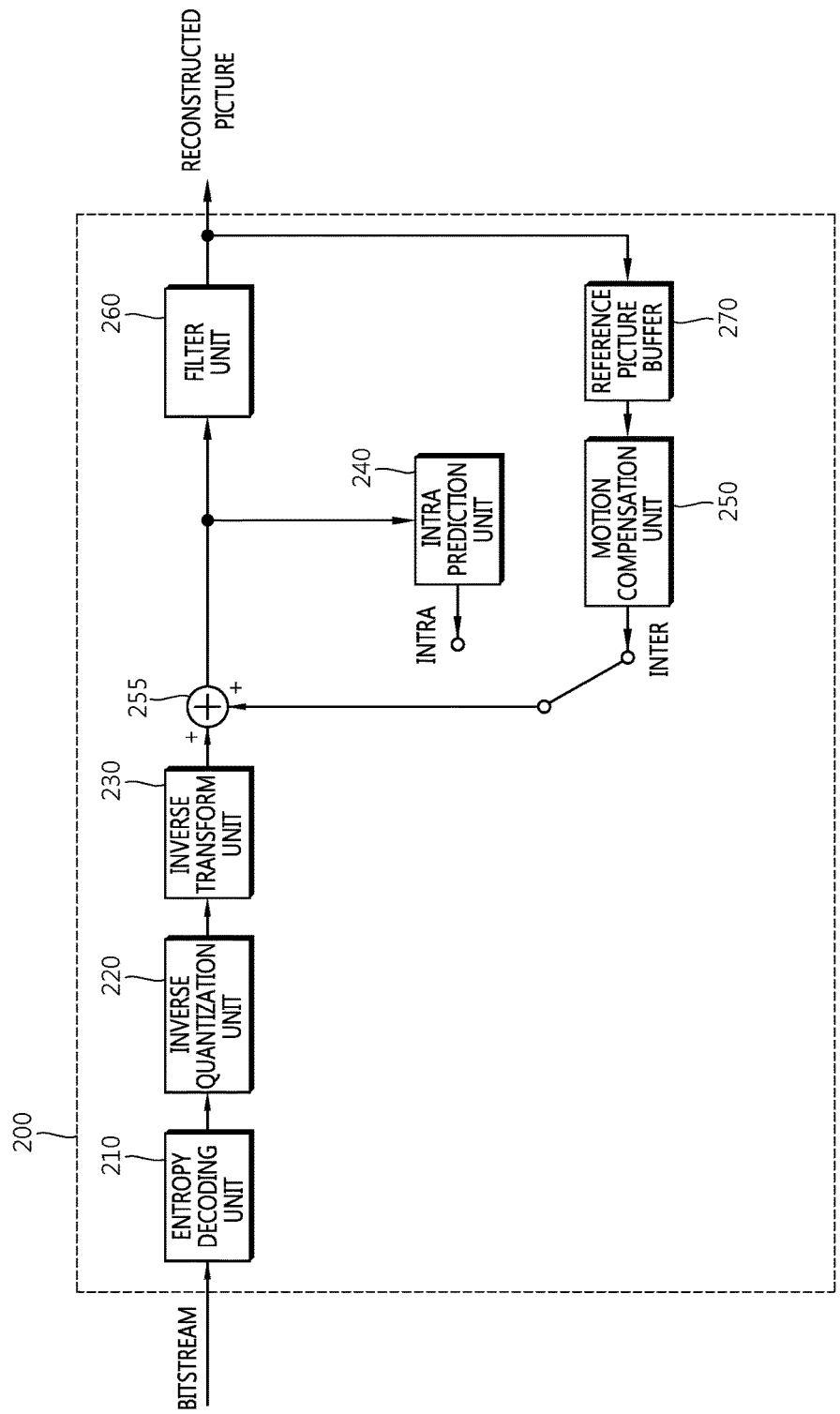
FIG. 2 is a block diagram showing a configuration according to an embodiment of a videovideo decoding apparatus to which the present invention is applied.

FIG. 2 is a block diagram showing a configuration according to an embodiment of a video decoding apparatus to which the present invention is applied.

Referring to FIG. 2, the video decoding apparatus 200 includes an entropy decoding unit 210, an inverse quantization unit 220, an inverse transform unit 230, an intra prediction unit 240, a motion compensation unit 250, a filter unit 260, and a reference picture buffer 270.

The video decoding apparatus 200 receives a bitstream from a coder, decodes the bitstream in intra mode or inter mode, and outputs a reconfigured picture according to the decoding, that is, a reconstruction picture. A switch is switched to intra mode in the case of intra mode and to inter mode in the case of inter mode. The video decoding apparatus 200 obtains a residual block from an input bitstream, generates a prediction block and generates a block configured by adding the residual block and the prediction block, that is, a reconstruction block.

The entropy decoding unit 210 performs entropy decoding on the input bitstream according to a probability distribution and outputs a quantized coefficient. The quantized coefficients are dequantized by the inverse quantization (dequantization) unit 220 and then inversely transformed by the inverse transform unit 230. The inverse transform unit (230) outputs a residual block.

In the case of intra mode, the intra prediction unit 240 generates a prediction block by performing spatial prediction using the pixel values of coded blocks that are neighboring to a current block.

In the case of inter mode, the motion compensation unit 250 generates a prediction block by performing motion compensation using a motion vector and a reference picture stored in the reference picture buffer 270.

The residual block and the prediction block are added by an adder 255. The added block is input into the filter unit 260. The filter unit 260 may apply at least one of a deblocking filter, an SAO, and an ALF to a reconstruction block or a reconstruction picture. The filter unit 260 outputs a reconfigured picture, that is, a reconstruction picture. The reconstruction picture can be stored in the reference picture buffer 270 and used in inter-picture prediction.

A method of improving the prediction performance of coding/decoding apparatuses includes a method of improving the accuracy of an interpolation picture and a method of predicting a difference signal. Here, the difference signal is a signal indicating a difference between an original picture and a prediction picture. In the present invention, a "difference signal" may be replaced with a "differential signal", a "residual block", or a "differential block" depending on context, and a person having ordinary skill in the art will distinguish them within a range that does not affect the spirit and essence of the invention.

Although the accuracy of an interpolation picture is improved, a difference signal is inevitably occurred. In order to improve coding performance, it is necessary to reduce a difference signal to be coded to a maximum extent by improving the prediction performance of the difference signal.

A filtering method using a fixed filter coefficient may be used as a method of predicting a difference signal. However, the prediction performance of this filtering method is limited because the filter coefficient cannot be adaptively used according to picture characteristics. Accordingly, it is necessary to improve the accuracy of prediction in such a manner that filtering is performed for each prediction block according to its characteristics.

Figure 3:
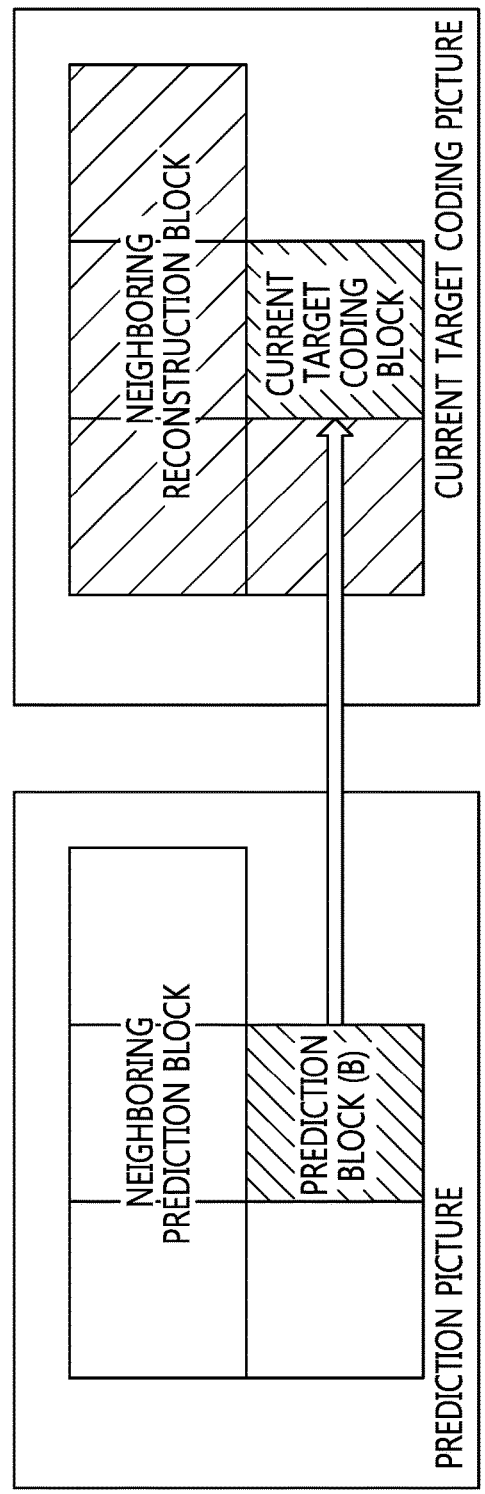
FIG. 3 is a conceptual diagram showing a concept of a picture and a block which are used in an embodiment of the present invention.

FIG. 3 is a conceptual diagram showing a concept of a picture and a block which are used in an embodiment of the present invention.

Referring to FIG. 3, a target coding block is a set of pixels that are spatially coupled within a current target coding picture. The target coding block is a unit on which coding and decoding are performed, and it may have a quadrangle or a specific shape. A neighboring reconstruction block is a block on which coding and decoding have been performed before a current target coding block is coded within a current target coding picture.

A prediction picture is a picture including a collection of prediction blocks used to code respective target coding blocks from the first target coding block to the current target coding block picture within a current target coding picture. Here, the prediction block refers to a block having a prediction signal used to code each target coding block within the current target coding picture. That is, the prediction block refers to each of blocks within a prediction picture.

A neighboring block refers to a neighboring reconstruction block of a current target coding block and a neighboring prediction block, that is, the prediction block of each neighboring reconstruction block. That is, a neighboring block refers to both a neighboring reconstruction block and a neighboring prediction block.

The prediction block of a current target coding block may be a prediction block that is generated by the motion compensation unit 112 or the intra prediction unit 120 according to the embodiment of FIG. 1. In this case, after a prediction block filtering process is performed on the prediction block generated by the motion compensation unit 112 or the intra prediction unit 120, the subtractor 125 may perform subtracting a filtered final prediction block from an original block.

A neighboring block may be a block stored in the reference picture buffer 190 according to the embodiment of FIG. 1 or a block stored in additional memory. Furthermore, a neighboring reconstruction block or a neighboring prediction block generated during a picture coding process may be used as a neighboring block.

Figure 4:
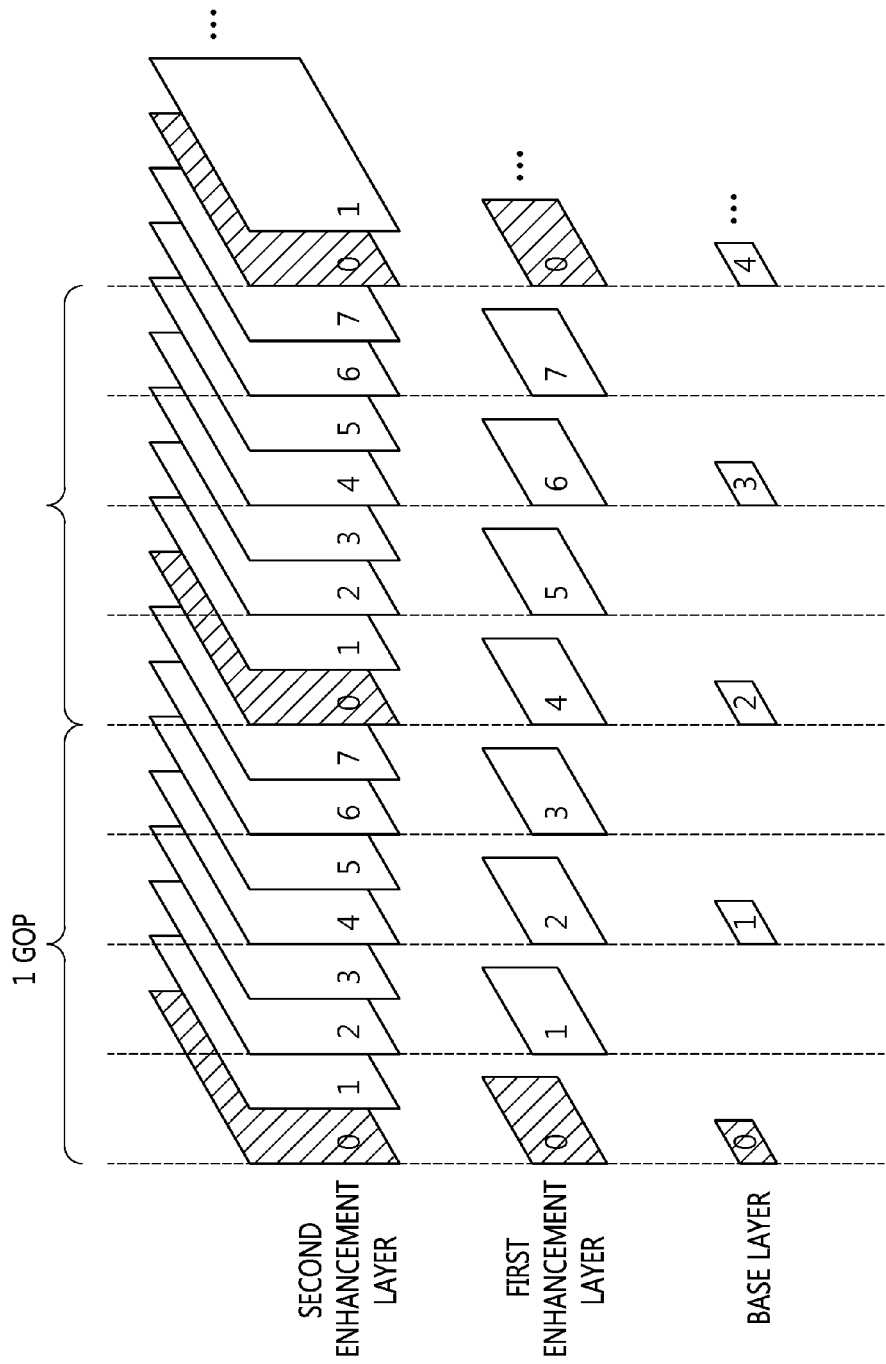
FIG. 4 is a conceptual diagram schematically showing an embodiment of a scalable video coding structure based on multiple layers.

FIG. 4 is a conceptual diagram schematically showing an embodiment of a scalable video coding structure based on multiple layers. In FIG. 4, a Group Of Picture (GOP) indicates a picture group, that is, a group of pictures.

A transmission medium is necessary to transmit video data, and a transmission medium has different performance depending on a variety of network environments. A scalable video coding method can be provided for the purpose of an application to a variety of transmission media or network environments.

The scalable video coding method is a coding method of improving coding/decoding performance by removing redundancy between layers using texture information, motion information, and a residual signal between layers. The scalable video coding method can provide a variety of scalabilities from spatial, temporal, and picture quality points of view depending on surrounding conditions, such as a transfer bit rate, a transfer error rate, and system resources.

Scalable video coding can be performed using a multi-layer structure so that a bitstream applicable to a variety of network situations can be provided. For example, a scalable video coding structure may include a base layer for performing compression and processing on picture data using a common picture coding method and an enhancement layer for performing compression and processing on picture data using both information on the coding of the base layer and a common picture coding method.

Here, a layer means a set of pictures and bitstream which are distinguished from one another according to criteria, such as a space (e.g., a picture size), time (e.g., coding order and picture output order), picture quality, and complexity. Furthermore, multiple layers may have mutual dependency.

Referring to FIG. 4, for example, a base layer may be defined to have a Quarter Common Intermediate Format (QCIF), a frame rate of 15 Hz, and a bit rate of 3 Mbps. A first enhancement layer may be defined to have a Common Intermediate Format (CIF), a frame rate of 30 Hz, and a bit rate of 0.7 Mbps. A second enhancement layer may be defined to have Standard Definition (SD), a frame rate of 60 Hz, and a bit rate of 0.19 Mbps. The formats, the frame rates, and the bit rates are only illustrative and may be differently determined as occasion demands. Furthermore, the number of layers is not limited to that of the present embodiment, but may be differently determined according to situations.

If a bitstream having a CIF and 0.5 Mbps is necessary, a bitstream may be segmented and transmitted in the first enhancement layer so that the bitstream has the bit rate of 0.5 Mbps. A scalable video coding method can provide temporal, spatial, and picture quality scalabilities through the method described in connection with the embodiment of FIG. 3.

Hereinafter, a target layer, a target picture, a target slice, a target unit, a target block, a target symbol, and a target bin mean a layer, a picture, a slice, a unit, a block, a symbol, and a bin, respectively, which are now being coded or decode. Accordingly, a target layer may be a layer to which a target symbol belongs, for example. Furthermore, other layers are layers except a target layer, and layers that the target can refer to. That is, other layers may be used to perform decoding in a target layer. Layers which a target layer can use may include temporal, spatial, and picture quality lower layers, for example.

Furthermore, a corresponding layer, a corresponding picture, a corresponding slice, a corresponding unit, a corresponding block, a corresponding symbol, and a corresponding bin hereinafter mean a layer, a picture, a slice, a unit, a block, a symbol, and a bin, respectively, corresponding to a target layer, a target picture, a target slice, a target unit, a target block, a target symbol, and a target bin. A corresponding picture refers to a picture of another layer that is placed in the same time axis as that of a target picture. If a picture within a target layer has the same display order as a picture within another layer, it can be said that the picture within the target layer and the picture within another layer are placed in the same time axis. Whether pictures are placed in the same time axis or not can be checked using a coding parameter, such as a Picture Order Count (POC). A corresponding slice refers to a slice placed at a position that is spatially the same as or similar to that of the target slice of a target picture within a corresponding picture. A corresponding unit refers to a unit placed at a position that is spatially the same as or similar to that of the target unit of a target picture within a corresponding picture. A corresponding block refers to a block placed at a position that is spatially the same as or similar to that of the target block of a target picture within a corresponding picture.

Furthermore, a slice indicating a unit on which a picture is split is hereinafter used as a meaning that generally refers to a partition unit, such as a tile and an entropy slice. Independent picture coding and decoding are possible between partition units.

Furthermore, a block hereinafter means a unit of picture coding and decoding. When a picture is coded and decoded, a coding or decoding unit refers to a partition unit when splitting one picture into partition units and coding or decoding the partition units. Thus, the coding or decoding unit may also be called a macro block, a Coding Unit (CU), a Prediction Unit (PU), a Transform Unit (TU), or a transform block, etc. One block may be further split into smaller lower blocks.

Inter layer Intra prediction, inter layer inter prediction, or inter layer differential signal prediction can be performed in order to remove redundancy between layers by taking the characteristics of scalable video coding, such as those described above, into consideration.

The inter-layer inter prediction is a method of using motion information on the corresponding block of a reference layer in an enhancement layer. This is described in detail later.

A scalable video coding method in accordance with an embodiment of the present invention is described in detail below with reference to FIGS. 5 to 10. Meanwhile, a method of coding an enhancement layer, such as that described with reference to FIG. 4, is described below.

Figure 5:
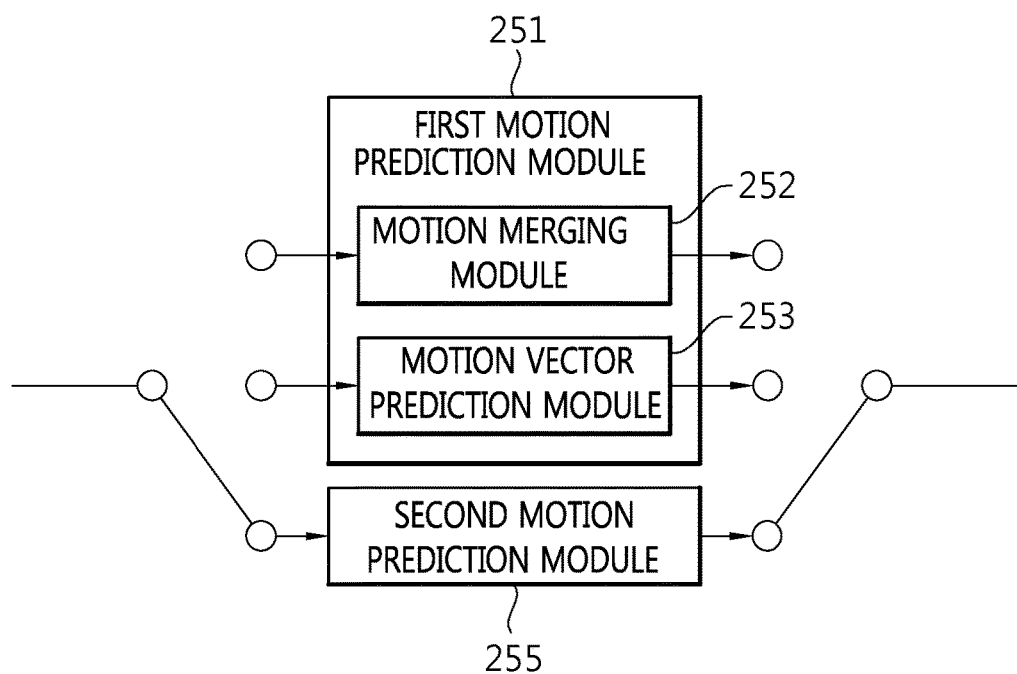
FIG. 5 is a block diagram showing an embodiment of the configuration of a motion compensation unit shown in FIG. 2.

FIG. 5 is a schematic block diagram showing the configuration of the decoding apparatus in accordance with an embodiment of the present invention. FIG. 5 shows a detailed configuration of the motion compensation unit 250 shown in FIG. 2.

Referring to FIG. 5, the motion compensation unit 250 predicts motion information (e.g., a motion vector) using a plurality of motion prediction methods. To this end, the motion compensation unit 250 may include a first motion prediction module 251 and a second motion prediction module 255 configured to predict the target decoding block of an enhancement layer using different methods.

The first motion prediction module 251 may use motion information on neighboring blocks within an enhancement layer in order to predict motion information on the target decoding block of the enhancement layer.

For example, the motion merging module 252 of the first motion prediction module 251 may use motion information on neighboring candidate blocks as motion information on the target decoding block and predict motion information on the target decoding block of the enhancement layer using a motion merging method defined in HEVC, for example.

More particularly, in the motion merging method, a coding apparatus can select any one motion merging candidate from a motion merging candidate list in which motion information on neighboring blocks are combined and signaled an index for the selected motion merging candidate.

Meanwhile, the decoding apparatus can select any one motion merging candidate as a motion vector for the target decoding block using the motion merging candidate index signaled by the coding apparatus from a motion merging candidate list, previously produced.

The motion vector prediction module 253 can use one candidate block having optimum performance in a viewpoint of rate-distortion, from among motion information on neighboring candidate blocks and predict motion information on the target decoding block of the enhancement layer using an Advanced Motion Vector Prediction (AMVP) method defined in HEVC, for example.

Particularly, a coding apparatus can compare rate-distortion cost values with each other for candidates in an AMVP candidate list including motion information on neighboring blocks, select any one motion prediction candidate based on a result of the comparison, and signals an index for the selected motion prediction candidate.

Meanwhile, the decoding apparatus can select any one motion prediction candidate using the motion prediction candidate index signaled by the coding apparatus from the motion prediction candidate list that has been previously produced and generate a motion vector for the target decoding block of the enhancement layer by adding a Motion Vector Difference (MVD) to the selected motion prediction candidate.

Meanwhile, the second motion prediction module 255 can predict motion information on the target decoding block of the enhancement layer using motion information on the corresponding block of the reference layer.

Figure 6:
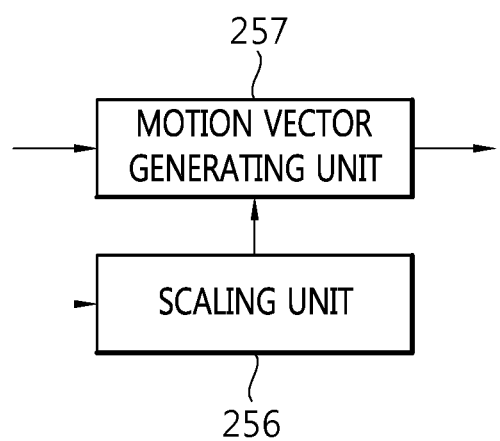
FIG. 6 is a block diagram showing an embodiment of the configuration of a second motion prediction module shown in FIG. 5.

Referring to FIG. 6, the second motion prediction module 255 may include a scaling unit 256 and a motion vector generating unit 257.

The scaling unit 256 can adaptively scale the motion information on the corresponding block of the reference layer depending on a difference between the resolutions of the layers. The motion vector generating unit 257 can generate the motion vector for the target decoding block of the enhancement layer by adding the MVD to the scaled motion information.

For example, the reference layer may be a base layer.

In the decoding apparatus according with an embodiment of the present invention, a module selected from the motion merging module 252, the motion vector prediction module 253, and the second motion prediction module 255, such as those described above, according to motion prediction mode can configure the motion vector for the target decoding block of the enhancement layer to be used in the motion compensation unit 250 based on motion information transferred from the entropy coding unit 150 or motion information derived from the reference layer.

Figure 7:
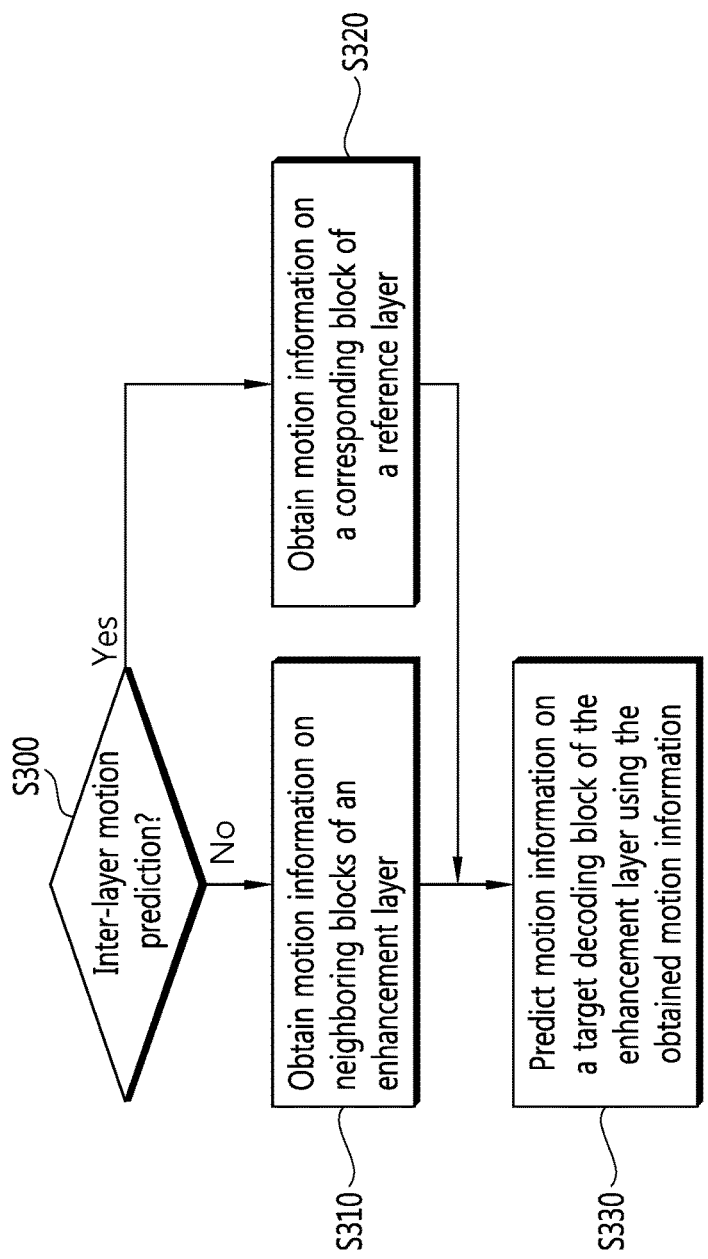
FIG. 7 is a flowchart illustrating a scalable video coding method in accordance with a first embodiment of the present invention.

FIG. 7 is a flowchart illustrating a scalable video coding method in accordance with a first embodiment of the present invention. The illustrated video coding method is described in connection with the block diagrams showing the configuration of the decoding apparatus of FIGS. 5 and 6 in accordance with an embodiment of the present invention.

Referring to FIG. 7, whether or not motion information prediction mode for a current target decoding block of an enhancement layer is a mode in which inter-layer inter coding will be performed is determined at step S300.

For example, the motion information prediction mode is determined based on information signaled by a coding apparatus. Particularly, the signaled information may include a flag indicating whether inter-layer inter coding will be performed or not.

Furthermore, the step S300 of determining the motion information prediction mode and a series of steps thereafter may be performed in a CU unit.

If it is determined that the motion information prediction mode is a first mode in which inter-layer inter coding is not performed, the first motion prediction module 251 obtains motion information on the neighboring blocks of an enhancement layer at step S310 and predicts motion information on the target decoding block of the enhancement layer using the obtained motion information on the neighboring blocks at step S330.

If however, it is determined that the motion information prediction mode is a second mode in which inter-layer inter coding is performed, the second motion prediction module 255 obtains motion information on the corresponding block of a reference layer at step S320 and predicts motion information on the target decoding block of the enhancement layer using the obtained motion information on the corresponding block of the reference layer at step S330.

Figure 8:
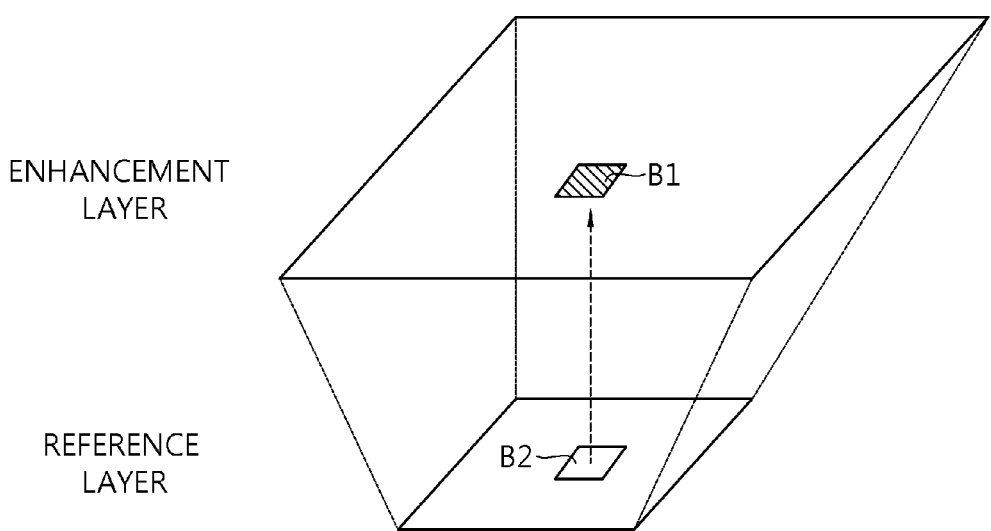
FIG. 8 is a diagram illustrating an embodiment of an inter-layer inter coding method.

Referring to FIG. 8, the scaling unit 256 of the second motion prediction module 255 can generate a motion vector for the target decoding block B1 by scaling a motion vector for the corresponding block B2 of the base layer based on a difference between the resolutions of the enhancement layer and the base layer in order to predict the motion information on the target decoding block of the enhancement layer B1.

For example, the corresponding block B2 of the base layer may be a block that is most well matched with the target decoding block B1 of the enhancement layer among blocks existing in the base layer, or may be a co-located block that has a position corresponding to the target decoding block B1 of the enhancement layer.

Furthermore, if a current target decoding block is included in the base layer not in the enhancement layer, the first motion prediction module 251 can predict motion information on the target decoding block of the base layer using motion information on neighboring blocks.

Meanwhile, relating to the generation of a prediction picture for video coding, in skip mode, motion information can be derived from neighboring blocks and a prediction picture or block can be generated based on the derived motion information, but the motion information or residual picture information may not be coded or decoded.

A video coding method in accordance with an embodiment of the present invention may be differently performed depending on whether the skip mode is used or not.

Figure 9:
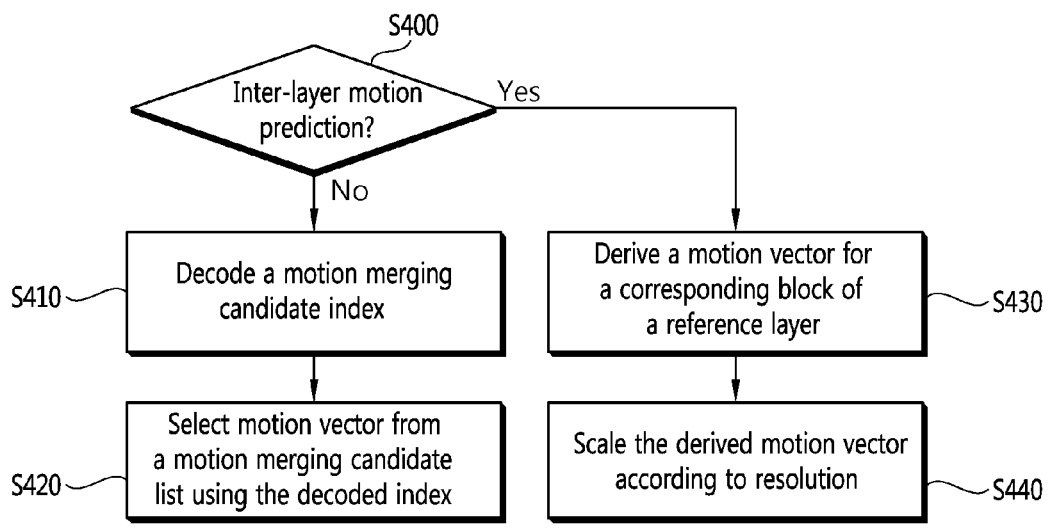
FIG. 9 is a flowchart illustrating a scalable video coding method in accordance with a second embodiment of the present invention.

FIG. 9 is a flowchart illustrating a scalable video coding method in accordance with a second embodiment of the present invention. FIG. 9 shows an example of a video decoding method when the skip mode is not used.

Referring to FIG. 9, first, whether inter-layer inter coding is performed on a current target decoding block of an enhancement layer or not is determined at step S400.

If it is determined that the inter-layer inter coding is not performed, the motion merging module 252 decodes a motion merging candidate index signaled by a coding apparatus at step S410 and selects one motion merging candidate as a motion vector for the target decoding block of the enhancement layer at step S420 using the decoded motion merging candidate index from a motion merging candidate list, previously produced.

If it is determined that the inter-layer inter coding is performed, the second motion prediction module 255 derives a motion vector for a corresponding block of a reference layer at step S430 and scales the derived motion vector according to resolution at step S440.

For example, the scaling unit 256 of the second motion prediction module 255 scales the motion vector for the corresponding block of the reference layer according to a difference between the resolutions of the reference layer and the enhancement layer. If the reference layer and the enhancement layer have the same resolution, the step S440 may be omitted and the motion vector for the corresponding block of the reference layer may be used as the motion vector for the target decoding block of the enhancement layer.

Figure 10:
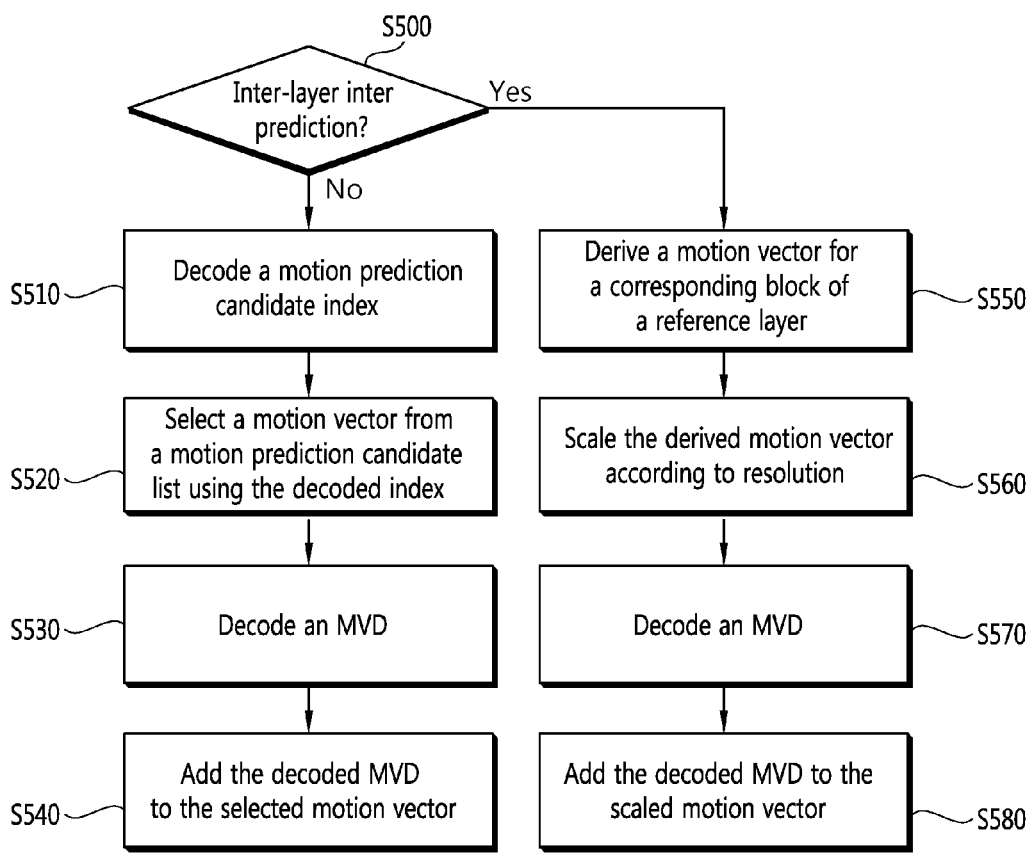
FIG. 10 is a flowchart illustrating a scalable video coding method in accordance with a third embodiment of the present invention.

FIG. 10 is a flowchart illustrating a scalable video coding method in accordance with a third embodiment of the present invention. FIG. 10 shows an example of a video decoding method when the skip mode is used.

Referring to FIG. 10, first, whether inter-layer inter coding is performed on a current target decoding block of an enhancement layer or not is determined at step S500.

If it is determined that the inter-layer inter coding is not performed, the motion vector prediction module 253 decodes a motion prediction candidate index signaled by a coding apparatus at step S510 and selects a motion vector using the decoded motion prediction candidate index from a motion prediction candidate list that has been previously produced at step S520.

Next, the motion vector prediction module 253 decodes a Motion Vector Difference (MVD) signaled by the coding apparatus at step S530 and generates a motion vector for a target decoding block of the enhancement layer by adding the decoded MVD to the motion vector selected at step S520 at step S540.

If it is determined that the inter-layer inter coding is performed, the second motion prediction module 255 derives a motion vector for a corresponding block of a reference layer at step S550 and the scaling unit 256 of the second motion prediction module 255 scales the derived motion vector according to a difference between the resolutions of the reference layer and the enhancement layer at step S560.

Next, the motion vector generating unit 257 decodes an MVD signaled by the coding apparatus at step S570 and generates a motion vector for the target decoding block of the enhancement layer by adding the decoded MVD to the scaled motion vector at step S580.

The scalable video coding methods and apparatus in accordance with some embodiments of the present invention have been described above on the basis of a video decoding method and apparatus, but the scalable video coding method in accordance with an embodiment of the present invention may be embodied by performing a series of steps according to a decoding method, such as that described with reference to FIGS. 5 to 10.

More particularly, in accordance with the scalable video coding methods and apparatuses according to the embodiments of the present invention, an intra prediction mode for a target coding block of an enhancement layer can be selected and a prediction signal can be generated according to the selected intra prediction mode by performing intra prediction having the same construction as that of a decoding method and apparatus, such as those described with reference to FIGS. 5 to 10.

In accordance with an embodiment of the present invention, in scalable video coding based on multiple layers, in order to predict motion information on an enhancement layer, motion information on neighboring blocks and motion information on a corresponding block of a base layer are selectively used. Accordingly, coding efficiency can be improved because the number of bits necessary for coding and decoding is reduced, and thus improved picture quality can be provided in the same bit rate.

In the above exemplary systems, although the methods have been described on the basis of the flowcharts using a series of the steps or blocks, the present invention is not limited to the sequence of the steps, and some of the steps may be performed in order different from that of the remaining steps or may be performed simultaneously with the remaining steps. Furthermore, those skilled in the art will understand that the steps shown in the flowcharts are not exclusive and they may include other steps or one or more steps of the flowchart may be deleted without affecting the scope of the present invention.

The above embodiments include various aspects of examples. Although all possible combinations for describing the various aspects may not be described, those skilled in the art may appreciate that other combinations are possible. Accordingly, the present invention should be construed as including all other replacements, modifications, and changes which fall within the scope of the claims.

What is claimed is:

1. A method of decoding a scalable video with a decoding apparatus using a processor, the method comprising:
generating a residual block relating to a target decoding block in a current layer based on quantized coefficients from a bitstream;
generating a prediction block relating to the target decoding block by performing motion compensation on the target decoding block based on a motion vector,
wherein generating the prediction block comprises:
deriving a first motion vector candidate for the target decoding block from at least one of neighboring blocks to the target decoding block;
deriving a second motion vector candidate for the target decoding block by using a motion vector of a corresponding block in a corresponding picture from a reference layer, depending on a difference between a resolution of the reference layer and a resolution of the current layer, the corresponding picture being representative of a reconstructed picture of the reference layer which is added to a reference picture list as a reference picture of the target decoding block;
generating a motion candidate list for the target decoding block in the current layer, the motion candidate list including comprising the first motion vector candidate and the second motion vector candidate;
obtaining index information from the bitstream, the index information being signaled to specify a location or an arrangement order of a motion vector candidate to be used as the motion vector predictor among motion vector candidates within the motion candidate list;
obtaining a motion vector predictor of the target decoding block using the motion candidate list and the index information;
the index information being signaled to specify a location or an arrangement order of a motion vector candidate to be used as the motion vector predictor among motion vector candidates within the motion candidate list; and
generating a prediction block relating to the target decoding block by performing motion compensation using the motion vector predictor; and
reconstructing the target decoding block based on the residual block and the prediction block.

2. The method of claim 1, wherein the corresponding picture is representative of a picture having a same picture order count (POC) as a current picture comprising including the target decoding block among a plurality of pictures in the reference layer.

3. The method of claim 1, wherein the corresponding picture is added to the reference picture list based on whether to perform an inter-layer prediction for the target decoding block.

4. The method of claim 1, wherein the corresponding block is representative of a co-located block of the target decoding block within the corresponding picture.

* * * * *